United States Patent [19]
Sasahara et al.

[11] Patent Number: 6,108,589
[45] Date of Patent: Aug. 22, 2000

[54] WIRE-AND-PULLY DRIVE LINK MECHANISM AND CONTROL SYSTEM FOR DRIVING THE SAME

[75] Inventors: Jun Sasahara; Nobuaki Ozawa, both of Saitama, Japan

[73] Assignee: Honda Giken Koygo Kabushiki Kaisha, Tokyo, Japan

[21] Appl. No.: 08/905,257

[22] Filed: Aug. 1, 1997

[30] Foreign Application Priority Data

Sep. 25, 1996 [JP] Japan ..................................... 8-274186

[51] Int. Cl.[7] ............................. G05B 15/00; G05B 19/00
[52] U.S. Cl. ......................... 700/245; 700/246; 700/247; 901/36; 901/39; 901/21
[58] Field of Search .................................... 294/111, 907; 901/36, 39, 21; 700/245, 246, 247

[56] References Cited

U.S. PATENT DOCUMENTS

| | | | |
|---|---|---|---|
| 3,820,120 | 6/1974 | Yamada ................................... | 700/10 |
| 5,344,246 | 9/1994 | Imoto et al. ............................ | 400/552 |
| 5,373,747 | 12/1994 | Ogawa et al. ...................... | 73/862.581 |
| 5,437,490 | 8/1995 | Mimura et al. ......................... | 294/106 |
| 5,592,999 | 1/1997 | Matsuura et al. ....................... | 180/227 |
| 5,599,151 | 2/1997 | Daum et al. ................................ | 414/7 |
| 5,647,723 | 7/1997 | Rush ...................................... | 414/735 |
| 5,876,325 | 3/1999 | Mizuno et al. .......................... | 600/102 |

FOREIGN PATENT DOCUMENTS 6-8178  of 1994  Japan .

OTHER PUBLICATIONS

Abstract of English JP 6–8178

*Primary Examiner*—William Grant
*Assistant Examiner*—Victoria Robinson
*Attorney, Agent, or Firm*—Lyon & Lyon LLP

[57] ABSTRACT

A wire-and-pulley drive link mechanism such as a robot hand, comprising a base, a linkage connected to said base by a first joint and having a first link and a second link connected by a second joint like fingers. The base carries motors for individual links. A wire-and-pulley drive system is provided such that said linkage moves relative to said base and said first link moves relative to said second link moves when driven by said motors. The wire is made of amorphous material and a coil is wound on each of the wires to detect stress or tensile force by sensing a change of magnetic permeability generated when the wire is subject to external force. A control system having a joint servo is provided and determines a manipulated variable to be supplied to the motor based on at least the detected stress and a servo gain.

18 Claims, 10 Drawing Sheets

FIG. 11

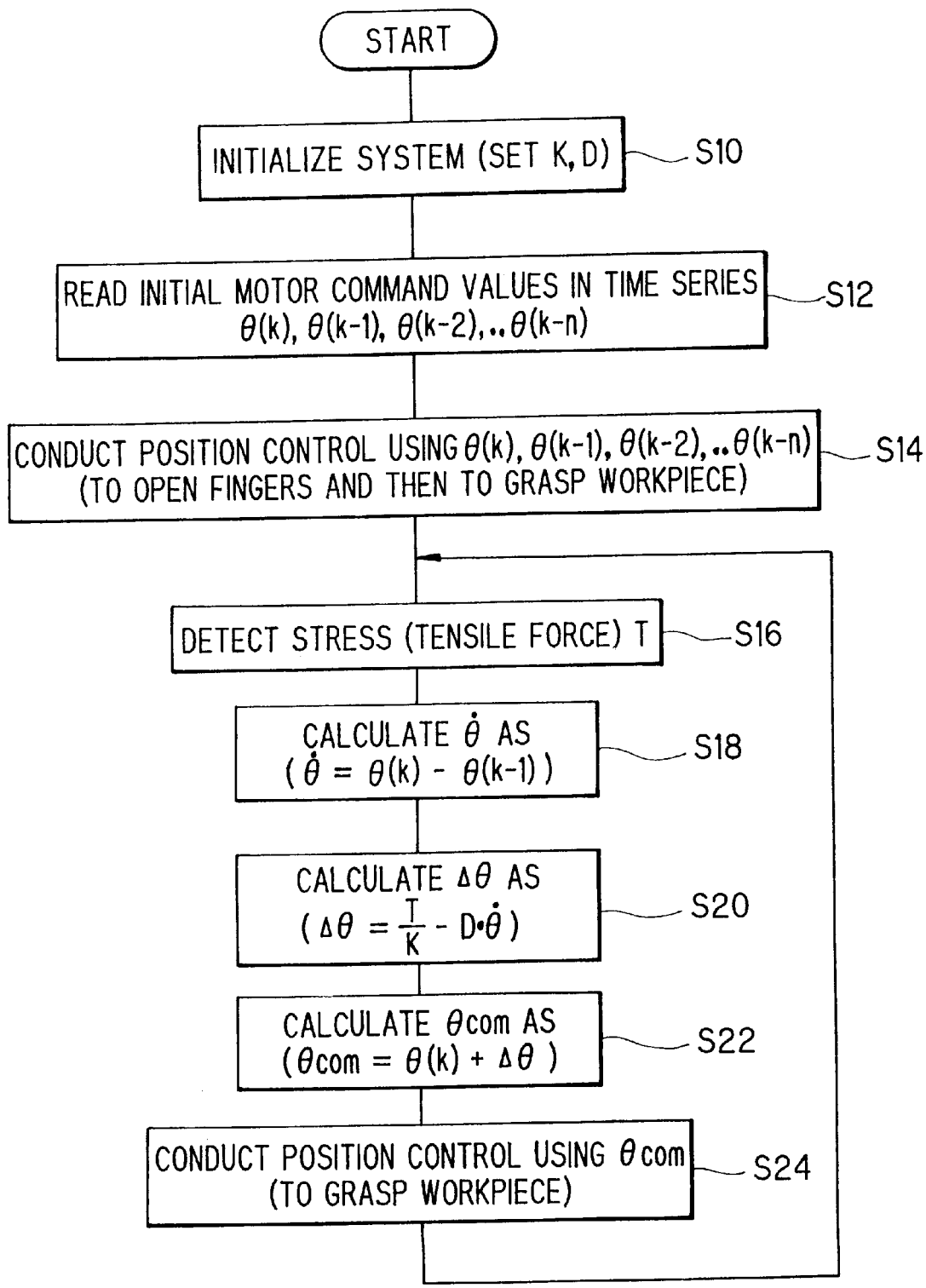

START
↓
INITIALIZE SYSTEM (SET K,D) — S10
↓
READ INITIAL MOTOR COMMAND VALUES IN TIME SERIES
$\theta(k), \theta(k-1), \theta(k-2), ... \theta(k-n)$ — S12
↓
CONDUCT POSITION CONTROL USING $\theta(k), \theta(k-1), \theta(k-2), ... \theta(k-n)$ — S14
(TO OPEN FINGERS AND THEN TO GRASP WORKPIECE)
↓
DETECT STRESS (TENSILE FORCE) T — S16
↓
CALCULATE $\dot{\theta}$ AS
($\dot{\theta} = \theta(k) - \theta(k-1)$) — S18
↓
CALCULATE $\Delta\theta$ AS
($\Delta\theta = \frac{T}{K} - D \cdot \dot{\theta}$) — S20
↓
CALCULATE $\theta com$ AS
($\theta com = \theta(k) + \Delta\theta$) — S22
↓
CONDUCT POSITION CONTROL USING $\theta com$ — S24
(TO GRASP WORKPIECE)

WIRE-AND-PULLY DRIVE LINK MECHANISM AND CONTROL SYSTEM FOR DRIVING THE SAME

BACKGROUND OF THE INVENTION

1. Field of the Invention

This invention relates to a wire-and-pulley drive link mechanism and a control system for driving the same, more particularly to a wire-and-pulley drive link mechanism for a robot hand or the like and a control system for driving the link mechanism.

2. Description of the Related Art

A wire-and-pulley drive link mechanism for a robot hand or the like, specifically a wire-and-pulley drive articulated mechanism is taught, for example, by Japanese Patent Laid-Open Application No. Hei 6(1994)-8,178. This system is a multifinger hand similar to the human hand. It has four frames successively connected to a base through four joints.

As disclosed in the reference, a number of motors corresponding to the number of joints are mounted on the base. The output shaft of each motor is fitted with a drive pulley. Each frame is driven by pulling it with a wire wound about a driven pulley fixed thereon so as to give the frame a degree of freedom, e.g., rotational. One end of a cantilever is fixed to the base to impart tension to the wire. A strain gage is pulled by the cantilever and the tensile force in the wire is measured by detecting the amount of bending thereof. The detected tensile force is fed to the motor controller for feedback control so as to prevent overloading of the hand.

With this prior-art arrangement, however, the detection means for detecting the tensile force acting on the wire is constituted as being separate from the wire. This increases the weight of the hand and makes the configuration complex. Moreover, to increase the detection accuracy in this system, it is generally necessary to reduce the strength of the portion which is subject to force for detection. This is problematic, however, since it frequently results in insufficient strength of the overall system.

BRIEF SUMMARY OF THE INVENTION

The object of this invention is therefore to overcome the foregoing problems of the prior art by providing a wire-and-pulley drive link mechanism, in which the configuration of the detection means to detect the stress (tensile force) acting on the mechanism is simplified.

Another object of the invention is to provide a wire-and-pulley drive link mechanism having the detection means to detect the stress (tensile force) acting on the mechanism which has sufficient strength for the overall mechanism.

Still another object of this invention is therefore to overcome the foregoing problems of the prior art by providing a wire-and-pulley drive robot, in which the configuration of the detection means to detect the stress (tensile force) acting on the mechanism is simplified and has sufficient strength for the overall mechanism.

Yet still another object of the invention is to provide a control system for driving a wire-and-pulley drive link mechanism having the detection means to detect the stress (force) acting on the mechanism which makes it possible to conduct an effective compliance control based on the detected stress.

This invention achieves these objects by providing a wire-and-pulley drive link mechanism, comprising a first link and a second link connected by a joint; an actuator mounted on said first link; a pulley mounted on said second link; a wire wound around said actuator and said pulley such that said second link moves relative to said first link when driven by said actuator; and stress detecting means for detecting stress acting on said wire, said stress detecting means being mounted on said wire to detect stress by sensing the change of magnetic permeability generated in said wire.

BRIEF EXPLANATION OF THE DRAWINGS

The foregoing and other objects and advantages of the invention will be more apparent from the following description and the accompanying drawings, in which:

FIG. 11 is a flow chart showing the algorithm and the operation of the control system illustrated in FIG. 7;

DETAILED DESCRIPTION OF THE PREFERRED EMBODIMENTS

An embodiment of the invention will now be explained with reference to the attached drawings.

Figure 1:
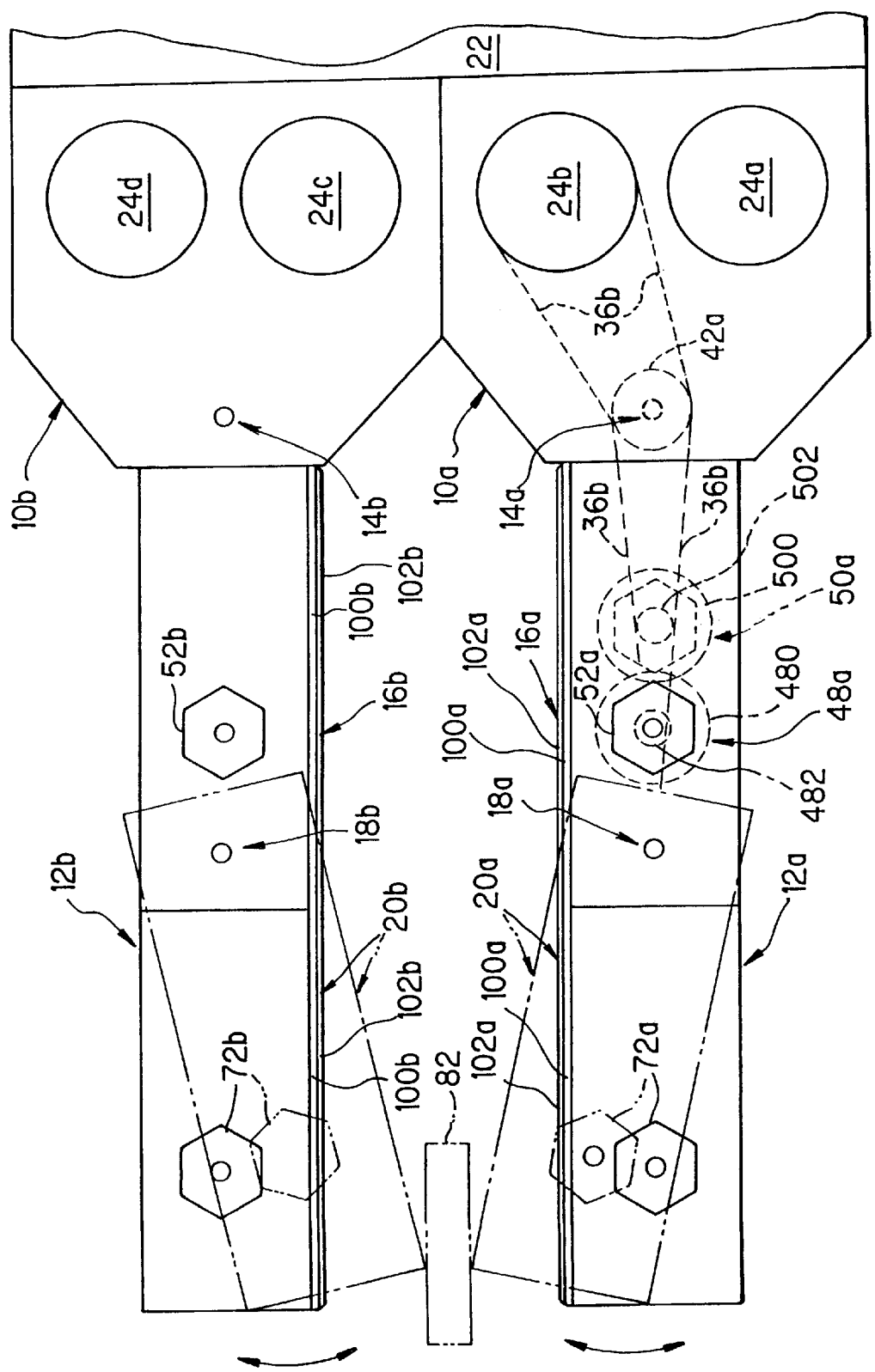
FIG. 1 is a plan view showing an overall configuration of a wire-and-pulley drive link mechanism according to the invention.
Figure 2:
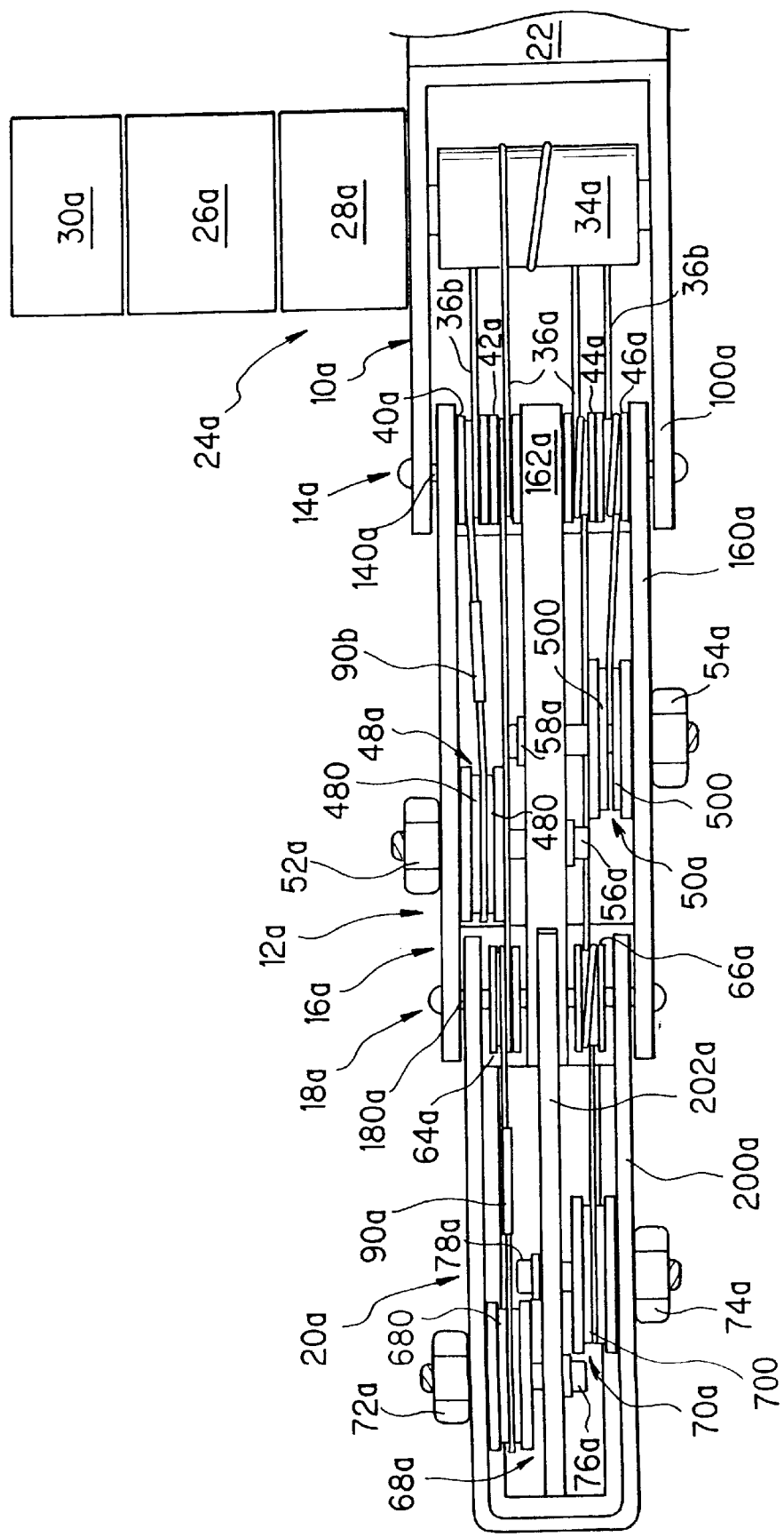
FIG. 2 is an enlarged right side view of the link mechanism illustrated in FIG. 1.
Figure 3:
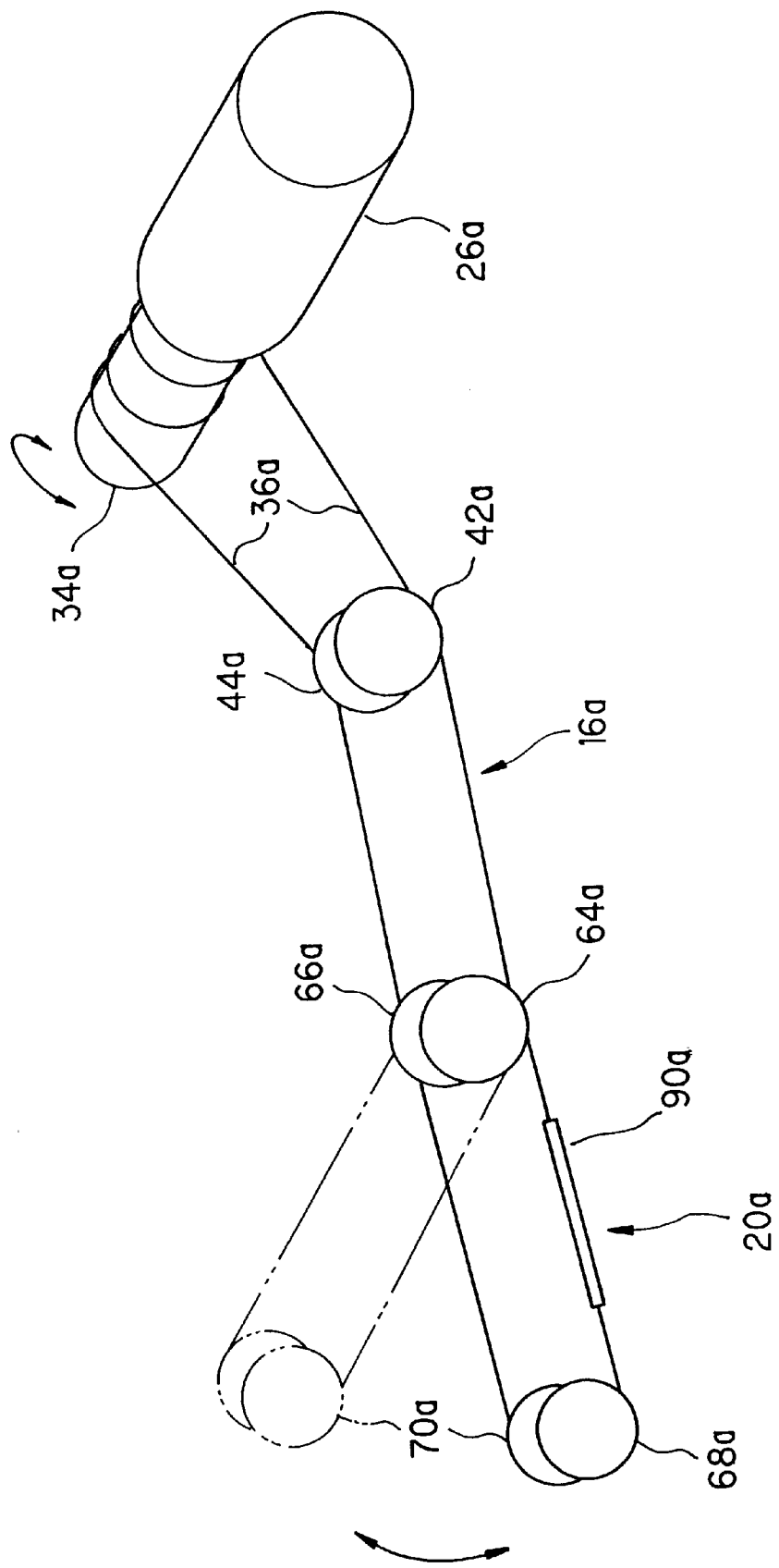
FIG. 3 is an explanatory view explaining the wire-and-pulley drive of the link mechanism illustrated in FIG. 1.

FIG. 1 is a top view of a wire-and-pulley drive link mechanism which is an embodiment of the invention, FIG. 2 is an enlarged right side view thereof, and FIG. 3 is a perspective schematic view explaining the wire-and-pulley drive in the link mechanism. This embodiment is a specific application of the mechanism modeled on fingers of the human hand.

The system comprises bases 10a, 10b and first and second linkages 12a, 12b connected one to each base. The first (second) linkage 12a (12b) comprises a first link 16a (16b) connected to the base 10a (10b) by a first joint 14a (14b) and a second link 20a (20b) connected to the first link 16a (16b) by a second joint 18a (18b).

The bases 10a, 10b are connected to each other and integrally attached to a robot arm 22. The so-configured system thus has two two-jointed fingers wherein the first and second links 16, 20 corresponding to the fingers can rotate about the first and second joints 14, 18. In other words, the first and second links 16, 20 are imparted with one degree of freedom whereby they can move relatively within one plane (e.g., the X-Y plane) in space represented by an XYZ coordinate system.

Four actuators 24a, 24b, 24c, 24d are mounted on the bases 10 to drive the total of four first and second links 16, 20 about the four joints 14, 18. As shown in detail in FIG. 2, actuator 24a (24b, 24c, 24d) comprises an electric motor 26a (26b, 26c, 26d) for link driving, a speed-reducer 28a (28b, 28c, 28d) for reducing the motor output speed, and a rotary encoder 30a (30b, 30c, 30d) for detecting the amount of motor rotation. These members are integrally interconnected. (FIG. 2 shows only 26a, 28a and 30a.)

The speed-reducer 28a (28b, 28c, 28d) output shaft (not shown) is inserted into and fixed by a boss screw to a wire reel 34a (34b, 34c, 34d) associated with one of the four joints. A wire 36a (36b, 36c, 36d) is wound around the wire reel 34a (34b, 34c, 34d). When the wire reel 34a (34b, 34c, 34d) is rotated, the wire 36a (36b, 36c, 36d) is pulled to produce relative displacement about the first joint 14a (14b) and the second joint 18a (18b). This configuration enables the wire reels 34 to be rotated in the same direction as that of the motor by the speed-reduced, torque-increased motor outputs to independently drive the joints (links) by means of wire-and-pulley drive. Since the motors 26 and the like are disposed on the bases 10, the weight of the moving portions is reduced.

The link mechanism will now be explained in detail with reference to FIGS. 2 and 3. To make the explanation easier, only the first linkage 12a will be taken up, on the understanding that the gist of the explanation also applies to the second link mechanism 12b.

As shown in the side view of FIG. 2, the base 10a has a frame 100a having the shape of the letter U laid on its side. The first link 16a has a first frame 160a (comprising upper, middle, and lower members as seen in FIG. 2) and is connected to the frame 100a, near the distal end thereof, by a shaft 140a (constituting the first joint 14a) so as to be movable relative to the base 10a. Four pulleys 40a, 42a, 44a, 46a (each 10 mm in diameter) are independently and rotatably fitted on the shaft 140a, two on either side of (above and below in FIG. 2) the middle member 162a of the first link frame 160a. Two wire retainers 48a, 50a are fixed to the first link frame 160a near its other end by nuts 52a, 54a and bolts 56a, 58a.

A frame 200a (comprising a U-shaped member and a middle member 202a) of the second link 20a is similarly connected to the first link frame 160a, near the other end thereof, by a shaft 180a (constituting the second joint 18a) so as to be movable relative to the first link 16a. Pulleys 64a, 66a (each 10 mm in diameter) are independently and rotatably fitted on the second joint 18a, one on either side of the middle member 202a of the second link frame 200a. Two wire retainers 68a, 70a are fixed to the second link frame 200a near its tip by nuts 72a, 74a and bolts 76a, 78a.

To be more specific, one end of the wire 36b that wound around the wire reel 34b (not visible in FIG. 2) is wound once around the pulley 40a and then fastened to the wire retainer 48a near the distal end of the first link frame 160a, and the other end of the wire 36b is wound once around the wire reel 34b, once around the pulley 46a on the lower side in the drawing and then fastened to the wire retainer 50a on the lower side. And, one end of the wire 36a that is wound once around the wire reel 34a is wound once around the pulley 42a near the proximal end of the first link frame 160a, wound once around the pulley 64a near the proximal end of the second link frame 200a, and then fastened to the wire retainer 68a near the tip of the second link frame 200a. The other end of the wire 36a is wound once around the pulley 44a, wound once around the pulley 66a, and fastened to the wire retainer 70a.

Referring to FIG. 3 for explaining the wire-and-pulley drive in the link mechanism, when the motor 26a rotates counter clockwise as seen in FIG. 3, the one end of the wire 36a is tensed and the other end thereof is relaxed, whereby the second link 20a is driven outward as indicated by the solid line, i.e., is driven away from the second linkage 12b. When the motor 26a rotates clockwise, the second link 20a is driven inward, i.e., is driven toward the second link 20b of the second linkage 12b. The first link 16a operates similarly by wire 36b and motor 26b. As a result, the first and second linkages 12a, 12b (fingers) can be independently driven to grasp a workpiece 82 as shown in FIG. 1.

As shown in FIG. 2, each of the wire retainers 48 (50, 68, 70) has a pair of disks 480 (500, 680, 700) that face each other. The wires 36 are inserted between the disks and clamped by tightening the nuts 52 (54, 72, 74) and bolts 56 (58, 76, 78). At the wire retainers 48a, 68a on one side, the one ends of the wires 36b, 36a are clamped between the disks in front of the bolt shafts passing through the disks as viewed in FIG. 2 (only one bolt shaft 482 of bolt 56a for the wire retainer 48a, is shown in FIG. 1). At the wire retainers 50a, 70a on the other side, the other ends of the wires 36b, 36a are clamped between the disks behind the bolt shafts passing through the disks (only one bolt shaft 502 of bolts 58a for the wire retainer 50a, is shown in FIG. 1). The positions at which the wires are fastened by the wire retainers are therefore offset from each other as viewed in FIG. 1.

The wires 36 are fastened after imparting an appropriate tension (e.g., several hundred gf) by pulling their free ends so as give the wires 36 an appropriate initial load. As will be explained later, this enables detection of wire breakage.

To enable the system of this embodiment to exhibit strong grasping force, wire made of high-strength amorphous material, namely, Fe-base amorphous material, is used for the wires 36. Specifically, there is used twisted wire rope consisting of seven metal strands (0.13 mm diameter) of $Fe_{77.5}$-$Si_{7.5}$-$B_{15}$ material. A tensile force test conducted to ascertain the strength of the wire showed it to have a breaking strength of 30 kgf in the seven twisted strand state. Since the maximum joint torque is estimated to be 15 kgf, this is more than adequate. Wire made of Co-base amorphous material can be used in place of wire made of Fe-base amorphous material.

Another reason for using wire made of amorphous material for the wires 36 is the well-known fact that an amorphous material exhibits a pronounced magnetism-stress characteristic, namely, experiences a greater change in magnetic permeability with stress than other materials.

The inventors conceived that a material with this characteristic could be used to advantage in a wire-and-pulley drive link mechanism such as for a robot hand. This will be explained.

A robot hand requires compliance control based on "force" information detected at the hand in combination with position information. This requires knowledge of the surface pressure of the hand and finger portions, the joint torque and the like. Attempts have been made to secure this information by the use of pressure sensors, torque sensors, tension sensors and the like.

As seen in the prior-art mechanism referred to earlier, however, installation of these sensors leads to increased weight, structural complexity, and degraded strength. In the mechanism of this invention, therefore, wire made of amorphous material is chosen for use in the wire drive because it exhibits both high strength and stress (tensile force) detection capability.

Figure 4:
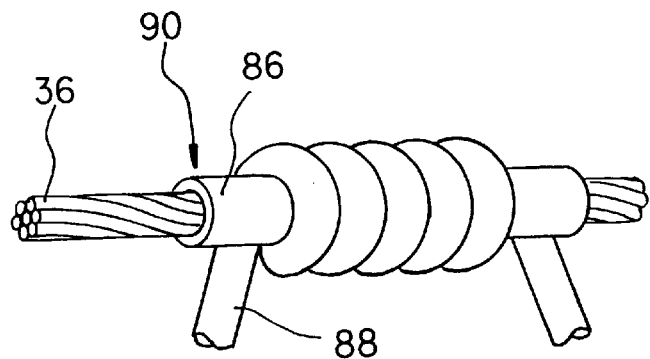
FIG. 4 is an explanatory perspective view of a portion of a stress (tensile force) sensor incorporated in the link mechanism illustrated in FIG. 1.

To utilize this capability, this embodiment detects a change in permeability by the use of stress (tensile force) sensors 90a, 90b, 90c, 90d (only 90a, 90b are shown in the drawings) each constituted as shown in FIG. 4 by winding a coil 88 on a coil core 86 and inserting the wire 36 therethrough. The detection is achieved by measuring the impedance (inductance) of the coil 88. A small tube made of Teflon (inner/outer diameter: 0.8/1.4 mm) is used as a bobbin so as to ensure effective utilization of magnetic flux by the coil 88 and avoid the movement of the wire 36.

As shown in FIGS. 2 and 3, each stress (tensile force) sensor 90 (coil 88) is disposed on the terminal branch side of the joint pulley where the stress (tensile force) acts directly, namely, near the tip of the link concerned. This is to eliminate the effect of external disturbance produced by friction between the wire and the pulley. This provision of a separate stress (tensile force) sensor 90 at each of the four joints 14, 18 enables independent calculation of the force or torque acting at each joint.

Figure 5:
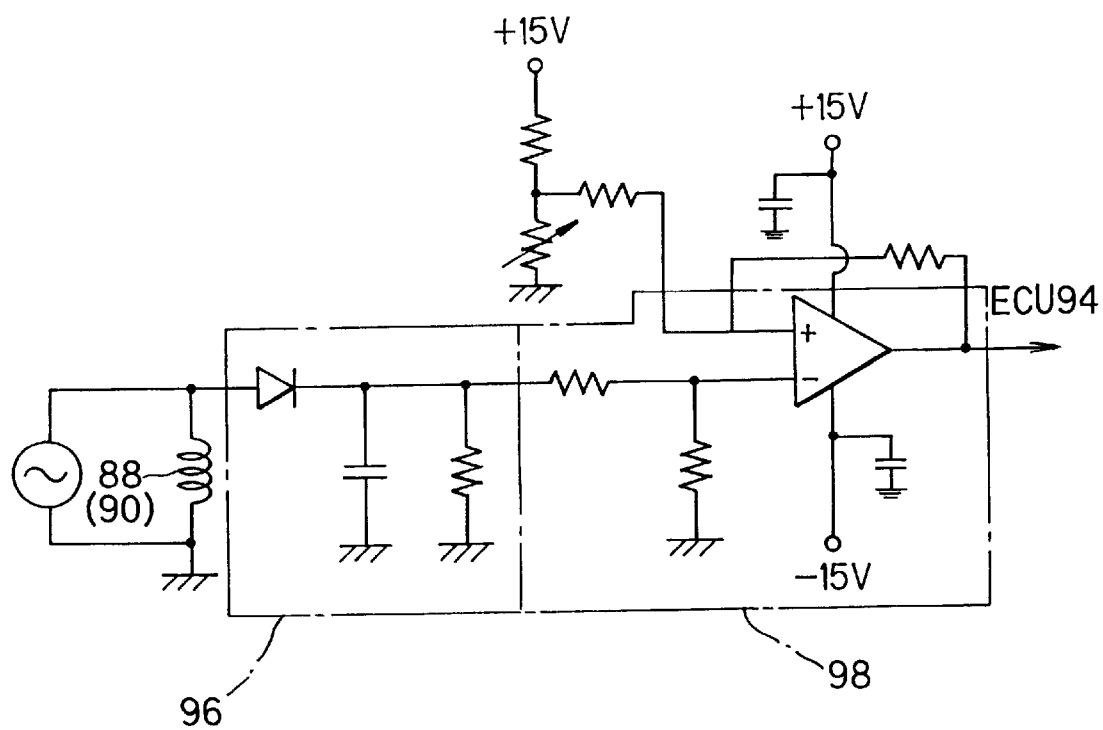
FIG. 5 is a view showing a circuit for detecting stress (tensile force) acting on the link mechanism based on an output from the sensor illustrated in FIG. 4.

FIG. 5 shows a circuit shown used for the stress (tensile force) detection. Specifically, an alternating voltage was applied across the coil 88 to produce oscillation and the voltage change caused by a change in stress (tensile force) is rectified, amplified and input to an electronic control unit (microcomputer) 94 (illustrated in FIG. 7). In the figure, reference numeral 96 designates a rectifying (smoothing) circuit and 98 a (differential) amplifying circuit.

Figure 6:
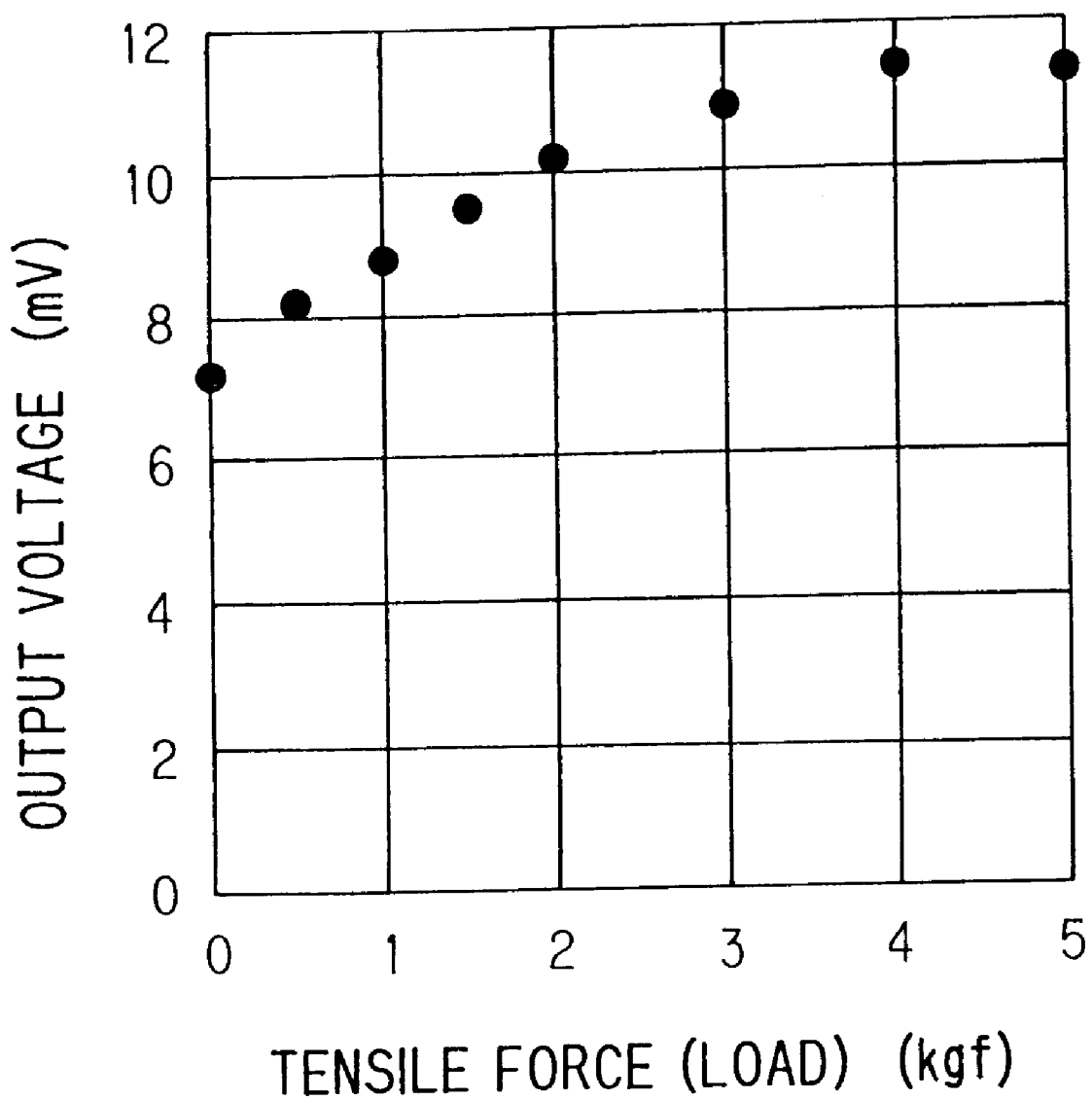
FIG. 6 is a graph showing the characteristic of the sensor output with respect to the stress (tensile force) acting on the link mechanism.

FIG. 6 shows the output voltage characteristic of the sensor 90 relative to the stress or tensile force (load) acted on the wire 36. The output voltage varies almost linearly with the tensile force in the range of 0–4 kgf. By this use of wires as a part of the sensor structure the system can be constructed without increasing its weight or structural complexity or degrading its strength. Since the wires 36 are given the initial load as mentioned earlier, moreover, breakage of a wire 36 can also be detected.

Returning to FIG. 1, the inward-facing surface portions of the frames 160, 200 of the first and second linkages 12, i.e., the gripping surfaces 100 destined to contact with the workpiece 82, are covered with rubber or other elastic members 102a, 102b to prevent slipping. The first and second linkages, including the frames 160, 200, are made of aluminum to avoid interference with the stress sensors 90, reduce weight and facilitate fabrication. The wire retainers 48, 50, 68, 70 are made of stainless steel in view of the high hardness of the amorphous wires 36 retained thereby.

The mechanism or system of the foregoing configuration can grasp the workpiece 82 as shown in FIG. 1. For this, the compliance required for holding the workpiece 82 is first set and then compliance control was implemented by determining the spring constant K and coefficient of viscosity D as explained below and utilizing this data in combination with position and force information based on the concept of compliance. By this it is possible to hold fragile objects, position bolts and conduct other operations that have been difficult to achieve solely by conventional positioning control.

Figure 7:
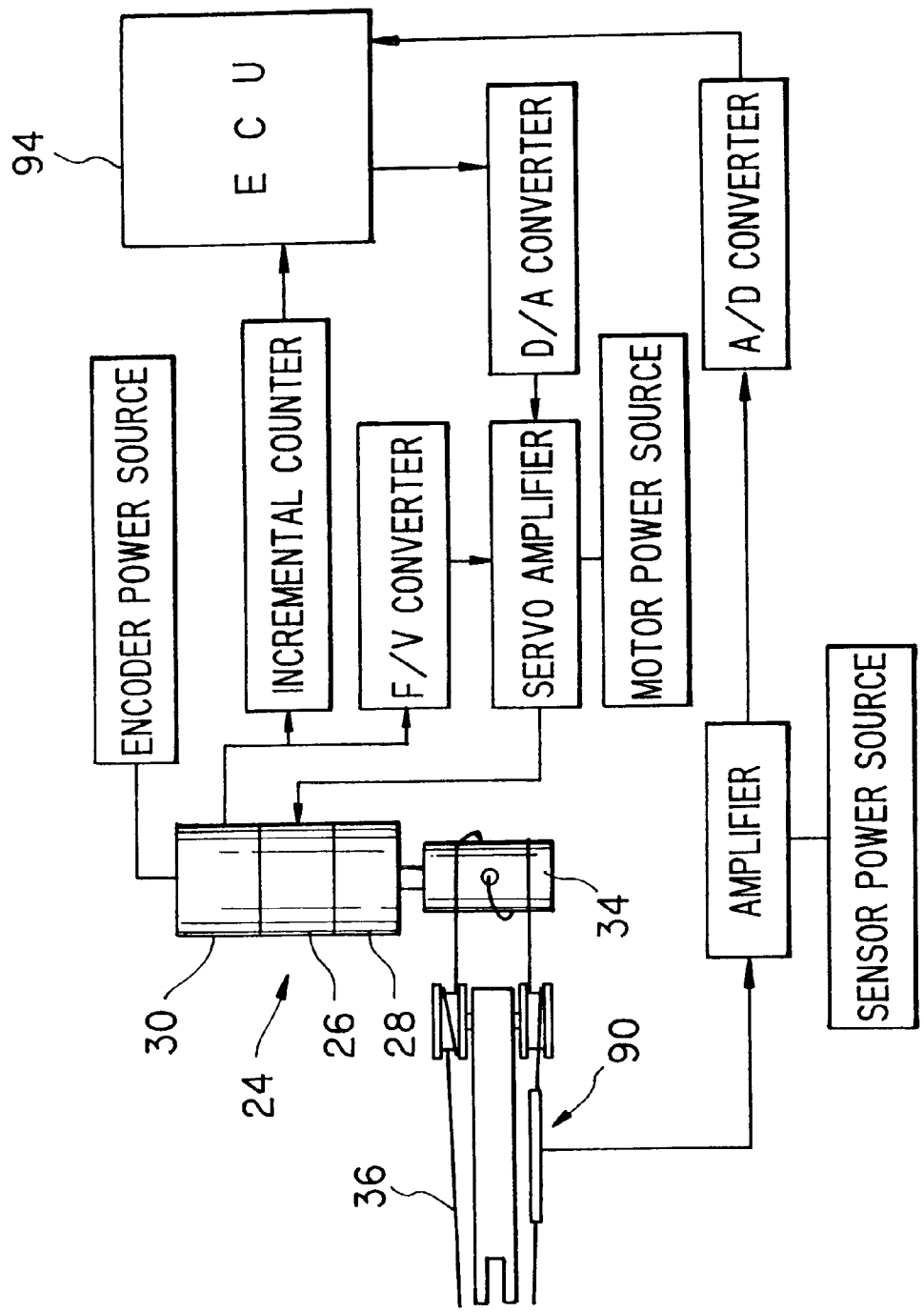
FIG. 7 is a schematic view showing an overall configuration of a control system for driving the link mechanism illustrated in FIG. 1 according to the invention.

The control system for driving the wire-and-pulley drive link mechanism described in the foregoing is shown in FIG. 7.

The output of the stress sensor 90 is forwarded to the electronic control unit (ECU) 94 through an amplifier (the amplifying circuit 98 illustrated in FIG. 5) and an A/D converter. The output of the rotary encoder 30 is forwarded to the ECU 94 through an incremental counter. As explained further below, the ECU 94 determines a motor rotation amount (manipulated variable) based on the detected values and sends a command value through a D/A converter to a joint servo amplifier. The joint servo amplifier supplies drive current to the motor 26 based on the command value. The output of the rotary encoder 30 is also input to the joint servo amplifier through an F/V converter for conducting joint servo control in the known manner.

The operation of the ECU 94, i.e., the control system for driving the wire-and-pulley drive link mechanism according to the invention, will now be explained.

Figure 8:
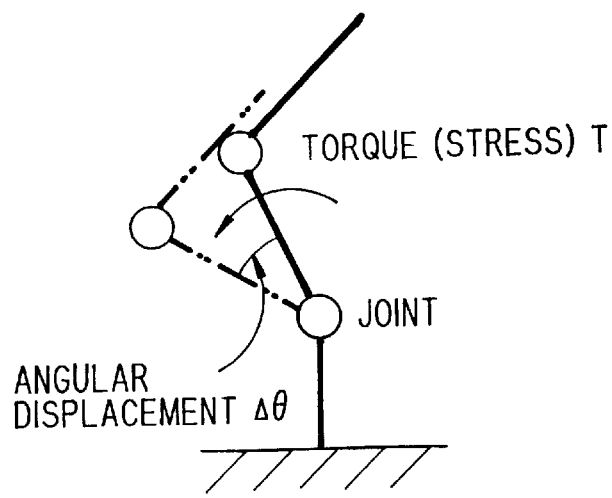
FIG. 8 is a view showing a model on which an algorithm of the control system illustrated in FIG. 7 is based.

As pointed out earlier, this is compliance control based on position information and force information for enabling the workpiece to be held without damaging it. The model of FIG. 8 was conceived for enabling the mechanism to achieve this. In this model, when the spring constant K is set to impart compliance to the joint, it follows that $$K\Delta\theta=T$$

Therefore $\Delta\theta=T/K$
where T: stress (tensile force), $\Delta\theta$: angular displacement.

Figure 9:
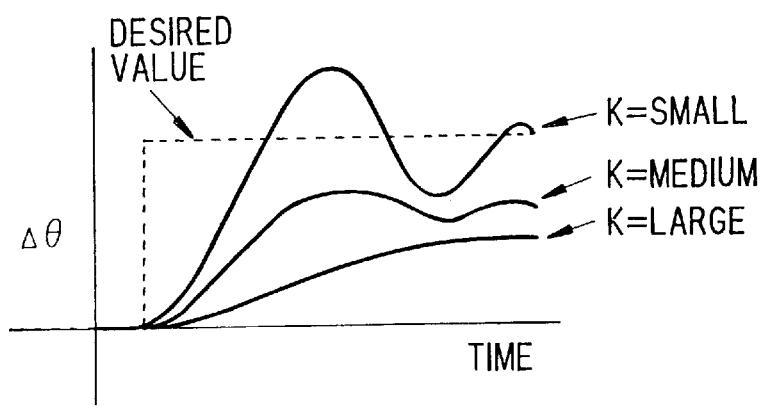
FIG. 9 is a graph similarly explaining the algorithm of the control system illustrated in FIG. 7.
Figure 10:
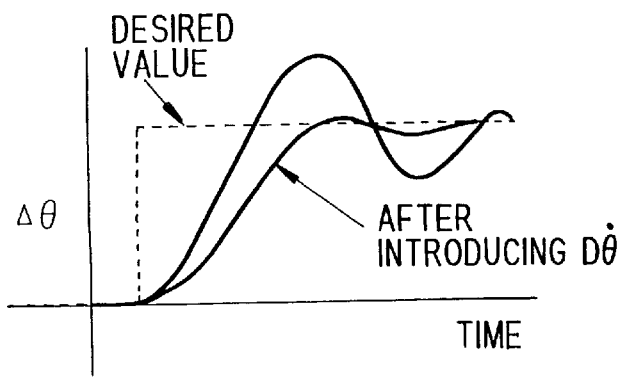
FIG. 10 is a graph similarly explaining the algorithm of the control system illustrated in FIG. 7.

To obtain a large angular displacement with a small force, K is preferably set small. If it is set too small, however, dynamic oscillation arises as shown in FIG. 9 owing to the relationship with the servo gain. When it is set too large, the resulting "stiffness" makes it impossible to obtain the desired angular displacement. A term representing the time variation of the angular displacement, i.e., coefficient of viscosity D is therefore introduced:

$$\Delta\theta=(T/K)-D\dot{\theta}$$

where $\dot{\theta}$: derivative or difference of angle. As a result, oscillation is suppressed as shown in FIG. 10. (FIGS. 9 and 10 show the response when the torque input is varied stepwise.)

Defining the current joint angle (initial motor command value) as $\theta$ and the (corrected) command value (manipulated variable) as $\theta$ com, it follows from the foregoing that $$\theta com=\theta+\Delta\theta$$

Therefore $\theta$ com=$\theta$+[(T/K)–D $\dot{\theta}$]
When in the above equation the input from the stress sensors 90 is used as T, the constant K is set as small as possible relative to the input range of T, and D is appropriately set in light of K, and $\theta$ com is, as a result, determined such that a hybrid position-force control is obtained. Thus, "compliance control" based on stress (tensile force) feedback can be achieved. K and D should appropriately be set for the object to be grasped. In this embodiment, the four links (joints) are controlled independently.

Figure 12:
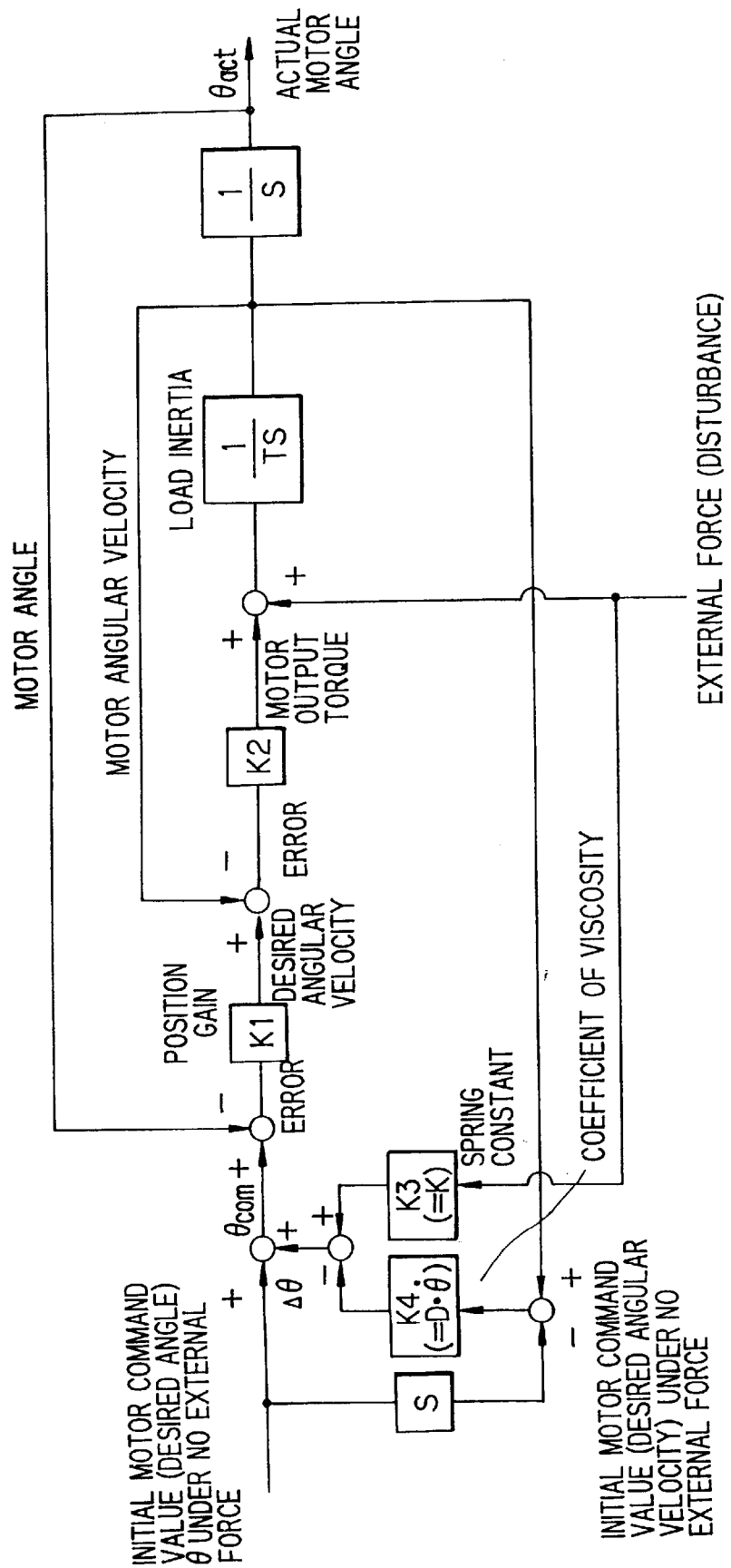
FIG. 12 is a block diagram showing a robotic joint servo based on the algorithm illustrated in FIG. 11.
Figure 13:
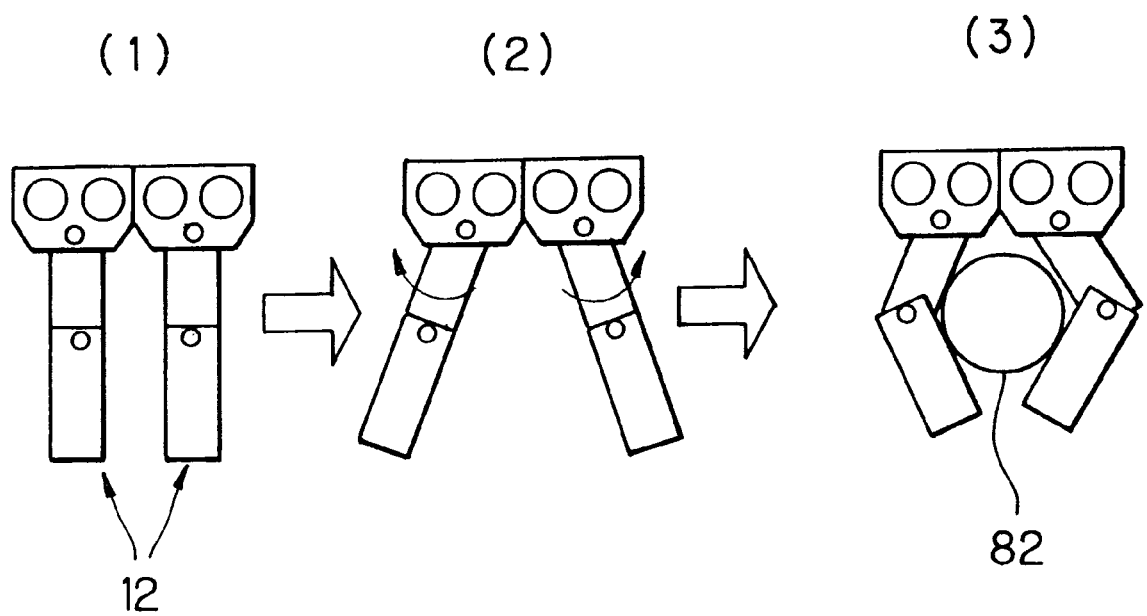
FIG. 13 is an explanatory view explaining an example of manipulation of the link mechanism illustrated in FIG. 1 and conducted based on the algorithm illustrated in FIG. 11.

FIG. 11 is a flow chart showing the operation of the system according to the invention which is based on the above algorithm. FIG. 12 is a block diagram representing it in a functional manner. FIG. 13 is an explanatory view for explaining the operation taking as example grasping of the linkages 12.

First, in S10, the system is initialized and K and D are set to or determined to be appropriate values.

Next, in S12, the initial motor command values (in time series) θ (k), θ(k-1), θ(k-2), ... θ(k-n) in time series values of the desired angles (desired positions) to be applied to the motors under no stress (external force), which were calculated/set by an offline computer and stored in the memory of the ECU 94 beforehand, are read from the memory. Here, (k) indicates a sampling number in a discrete-time system. The time series values are prepared for each of the four motors 26.

Next, in S14, the four motors 24 are driven in accordance with the read-out initial command values to manipulate the four links (joints) such that a position control is conducted. As shown in FIG. 13(1)–(3), this proceeds to drive the two fingers (linkages 12a, 12b) to align them in parallel, opening them and then causing them to grasp the workpiece 82. Specifically, as shown in FIG. 12, the joint servo control is conducted as described in the foregoing by eliminating the errors between the desired angle θ and the detected angle θ act and between the desired angular velocity and the detected angular velocity. As this control is well known, it will not be explained further here.

In this embodiment, the shape, position and type of material of the workpiece 82 are given in advance and the constant (gain) K and coefficient of viscosity D are set in S10 based thereon. For the purpose of the compliance, an elastic rubber sphere is used as the workpiece 82.

Next, the stress (tensile force) T acting on each link (joint) is detected through the stress sensors 90 in S16, the difference between the initial command values (initial the desired angles θ(k) and θ(k-1)) is calculated and defined as the value $\dot{\theta}$ in S18, and the angular displacement Δθ is calculated in S20 in accordance with the equation as illustrated in FIG. 11. The calculated angular displacement is added to the initial command value to obtain the corrected command value θ com in S22 and the motor is again driven based on the corrected command value (manipulated variable) θ com in S24. More specifically, the first and second linkages 12 move to grasp the workpiece 82. The stress (tensile force) at the instant they make contact with the workpiece 82 is detected and the steps S16 to S24 are looped until θ(k)+Δθ has reached the corrected command value θ com calculated based on the set constant K and coefficient of viscosity D.

As mentioned earlier, this system is a robot hand which is not equipped with a means for recognizing its surroundings, the grasping force is determined as a set value. If the robot (not shown) is provided with the means for recognizing its surroundings, however, the control system can recognize the position, shape, material etc., of the workpiece to enable more effective compliance control. Specifically, when the recognition means learns that the workpiece has been damaged, the control system will be able to ensure that the next grasping is conducted without causing damage by modifying the set values to change the applied force or stress.

Thus, in one form the embodiments are configured to provide a wire-and-pulley drive link mechanism, comprising a first link (base 10) and a second link (linkages 12) connected by a joint (14); an actuator (motor 24) mounted on said first link; a pulley (42) mounted on said second link; a wire (36) wound around said actuator and said pulley such that said second link moves relative to said first link when driven by said actuator; and stress detecting means (stress sensor 90) for detecting stress (T) acting on said wire, said stress detecting means being mounted on said wire to detect stress by sensing change of magnetic permeability generated in said wire.

With the aforesaid arrangement, in one form the embodiments make it possible to provide a wire-and-pulley drive link mechanism with sufficient overall strength, in which the configuration of the detection means to detect the stress (tensile force) acting on the mechanism is simplified. Moreover, the embodiments make it possible to conduct an effective compliance control based on the detected stress (tensile force). Specifically, said wire is made of amorphous material, and is Fe-base amorphous material. More specifically, said Fe-base amorphous material is $Fe_{77.5}$-$Si_{7.5}$-$B_{15}$ material. Alternatively, said amorphous material is Co-base amorphous material, and said wire is made of a plurality of strands each made of amorphous material. Said stress detecting means is a coil (88) wound around said wire, and said coil is covered by a tube. Since, said wire is imparted with an initial load, it becomes possible to detect braking of the wire. Moreover, since said first link is a base, it become possible to place the actuators thereon to decrease the weight of the movable parts. Said base is connected to a robot arm.

To be more specific, in one form the embodiments are configured to provide a wire-and-pulley drive robot hand, comprising a base (10); a linkage (12) connected to said base by a first joint (14), said linkage having a first link and a second link connected by a second joint (18), an actuator (motor 24) mounted on said base; a plurality of pulleys (40, 42, 44, 46, 64, 66) mounted on said base and said first and second link of said linkage; a plurality of wires (36) wound around the actuator and said pulleys such that said linkage moves relative to said base and said first link moves relative to said second link when driven by said actuator; and stress detecting means (stress sensor 90) for detecting stress (T) acting on said wires, said stress detecting means being mounted on said wires to detect stress by sensing a change of magnetic permeability generated in each of said wire, wherein said wires are made of amorphous material, wherein each of said wire is made of a plurality of strands each made of amorphous material, and wherein said wires are imparted with an initial load.

And in one form the embodiments are configured to provide a control system for driving a wire-and-pulley drive link mechanism, comprising a first link (base 10) and a second link (linkage 12) connected by a joint (14); an actuator (motor 24) mounted on said first link; a pulley (42) mounted on said second link; a wire (36) wound around said actuator and said pulley such that said second link moves relative to said first link when driven by said actuator; stress detecting means (stress sensor 90) for detecting stress (T) acting on said wire, said stress detecting means being mounted on said wire to detect stress by sensing change of magnetic permeability generated in said wire; manipulated variable determining means (S10–S22) for determining a manipulated variable (θ com) to be supplied to said actuator; said manipulated variable determining means determines said manipulated variable based on at least said detected stress (T); and driving means (S14, S24) for driving said actuator based on said determined manipulated variable. Specifically, said manipulated variable determining means comprising initial value determining means (S12) for determining an initial value (θ) to be supplied to said actuator in a joint servo; gain determining means (S10) for determining a servo gain (K, D); and manipulated variable determining means (S16–S22) for determining said manipulated variable (θ com) by correcting said initial value based on at least said detected stress (T) and said servo gain (K, D). More specifically, said servo gain comprises a spring constant (K) and a coefficient of viscosity (D) in said position servo.

In the foregoing embodiments, although the wire-and-pulley drive link mechanism is configured to have two linkages each having two links, it is alternatively possible to have a lesser or greater number of linkage and links.

In the foregoing embodiments, moreover, although the wire-and-pulley drive link mechanism is applied to a robot hand, the invention is not limited to this, but can also be applied to various other mechanisms.

In the foregoing embodiments, furthermore, although the wire is made of a metal material exhibiting a magnetism-stress characteristic such as Fe-base or Co-base amorphous alloy, other amorphous alloys can be used instead.

In the foregoing embodiments, furthermore, although the linkage is described as being made of aluminum, it can be made of resin composite material instead.

In the foregoing embodiments, although the position and velocity control is conducted in the joint servo illustrated in FIG. 12, velocity control is not absolutely necessary and position control alone is sufficient.

Although the invention has thus been shown and described with reference to specific embodiments, it should be noted that the invention is in no way limited to the details of the described arrangement, but changes and modifications may be made without departing from the scope of the invention, which is defined by the appended claims.

What is claimed is:

1. A wire-and-pulley drive link mechanism, comprising:
   a first link and a second link connected by a joint;
   an actuator mounted on said first link;
   a pulley mounted on said second link;
   a wire wound around said actuator and said pulley such that said second link moves relative to said first link when said wire is driven by said actuator; and
   stress detecting means for detecting stress acting on said wire, said stress detecting means being mounted on said wire to detect stress by sensing a change of magnetic permeability generated in said wire.

2. A link mechanism according to claim 1, wherein said wire is made of amorphous material.

3. A link mechanism according to claim 2, wherein said amorphous material is Fe-base amorphous material.

4. A link mechanism according to claim 2, wherein said amorphous material is Co-base amorphous material.

5. A link mechanism according to claim 2, wherein said wire is made of a plurality of strands each made of amorphous material.

6. A link mechanism according to claim 3, wherein said Fe-base amorphous material is $Fe_{77.5}$-$Si_{7.5}$-$B_{15}$ material.

7. A link mechanism according to claim 1, wherein said stress detecting means is a coil wound around said wire.

8. A link mechanism according to claim 7, wherein said coil is covered by a tube.

9. A link mechanism according to claim 1, wherein said wire is imparted with an initial load.

10. A link mechanism according to claim 1, wherein said first link is a base.

11. A link mechanism according to claim 10, wherein said base is connected to a robot arm.

12. A wire-an-pulley drive linkage mechanism, comprising:
    a base
    a linkage connected to said base by a first joint, said linkage having a first link and a second link connected by a second joint,
    an actuator mounted on said base;
    a plurality of pulleys mounted on said base and said first and second link of said linkage;
    a plurality of wires wound around the actuator and said pulley such that said linkage moves relative to said base and said first link moves relative to said second link when said wires are driven by said actuator; and
    stress detecting means for detecting stress acting on said wires, said stress detecting means being mounted on aid wires to detect stress by sensing a change of magnetic permeability generated in each of said wire.

13. A link mechanism according to claim 12, wherein said wires are made of amorphous material.

14. A link mechanism according to claim 12, wherein each said wire is made of a plurality of strands each made of amorphous material.

15. A link mechanism according to claim 12, wherein said wires are imparted with an initial load.

16. A wire-and-pulley drive link mechanism, comprising:
    a first link and a second link connected by a joint;
    an actuator mounted on said first link;
    a pulley mounted on said second link;
    a wire wound around said actuator and said pulley such that said second link moves relative to said first link when said wire is driven by said actuator;
    stress detecting means for detecting stress acting on said wire, said stress detecting means being mounted on said wire to detect stress by sensing change of magnetic permeability generated in said wire;
    manipulated variable determining means for determining a manipulated variable to be supplied to said actuator; said manipulated variable determining means determines said manipulated variable based on at least said detected stress; and
    driving means for driving said actuator based on said determined manipulated variable.

17. A wire-and-pulley drive link mechanism, comprising:
    a first link and a second link connected by a joint;
    an actuator mounted on said first link;
    a pulley mounted on said second link;
    a wire wound around said actuator and said pulley such that said second link moves relative to said first link when said wire is driven by said actuator;
    stress detecting means for detecting stress acting on said wire, said stress detecting means being mounted on said wire to detect stress by sensing change of magnetic permeability generated in said wire;
    manipulated variable determining means for determining a manipulated variable to be supplied to said actuator; said manipulated variable determining means determines said manipulated variable based on at least said detected stress; and
    driving means for driving said actuator based on said determined manipulated variable;
    wherein said manipulated variable determining means comprises:
    initial value determining means for determining an initial value to be supped to said actuator in a joint servo;
    gain determining means for determining a servo gain; and
    manipulated variable determining means for determining said manipulated variable by correcting said initial value based on at least said detected stress and said servo gain.

18. A link mechanism according to claim 17, wherein said servo gain comprises a spring constant and a coefficient of viscosity in said position servo.

* * * * *